April 6, 1948.   P. BROWN   2,438,990
WELDING ROD HOLDER
Filed Oct. 29, 1945
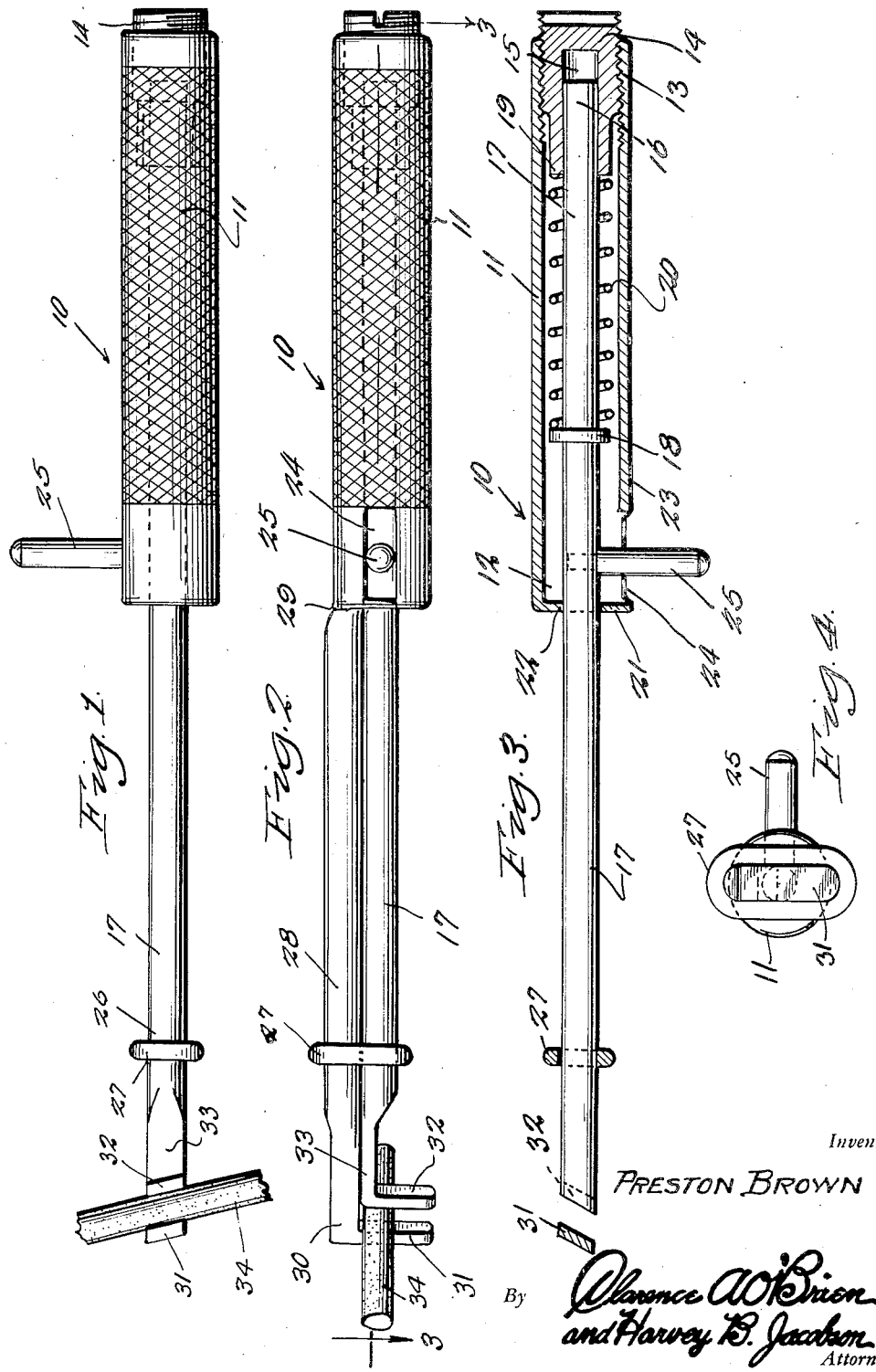
Inventor
PRESTON BROWN
By Clarence A. O'Brien
and Harvey B. Jacobson
Attorneys Patented Apr. 6, 1948

2,438,990

UNITED STATES PATENT OFFICE 2,438,990

WELDING ROD HOLDER

Preston Brown, Selma, Ala.

Application October 29, 1945, Serial No. 625,292

2 Claims. (Cl. 219—8)

My invention as described herein, and illustrated in the accompanying drawings, consists of a welding rod holder, an object of which is to provide means whereby a welding rod may be picked up, held in position and quickly released.

Another object of my invention is to provide a welding rod holder having a pair of inclined jaw members.

Other features and advantages will become more readily apparent from the following description and the accompanying illustrative drawings in which:

Figure 1 is an elevational view of my rod holder,

Figure 2 is another elevational view thereof,

Figure 3 is a sectional elevation of the device, and

Figure 4 is an end view of the holder.

In the accompanying drawings and in the following specification, the same reference characters are used to designate the same parts and elements throughout and in which 10 refers to my invention in its entirety and 11 indicates a tubular handle, the bore 12 of which is closed at one end 13 by a tubular screw bearing cap 14 threaded into said end and into the reduced bore 15 of which seats the inner end 16 of a movable shank 17 provided with an integral collar 18, between which and the inner edge 19 of the cap 14, a spring 20 is coiled around said shank. In the inner wall 21 of tube 11 is a bore 22 through which the shank 17 operates. In the side wall 23 of the member 11 is provided a slot 24, through which control pin 25 fixed to the shank projects. The lower end portion 26 of the shank 17 is provided with a loop ring 27, which ring is fixed to the shank 28 integrally connected at 29 to the member 11, said shank 17 being slidably movable through the ring 27. The lower end 30 of the shank 28 is provided with a right angular inclined jaw 31, which coacts with a similarly arranged movable jaw 32 terminating on the lower end 33 of shank 17, whereby either a welding rod 34 or an electrode may be held at an angle relative to the shanks 17 and 28.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described my invention that which I claim as new and desire to procure by Letters Patent is:

1. A welding rod holder comprising an elongated hollow handle having an axially disposed bearing opening in its front end and being internally threaded at its open rear end, a forwardly extending fixed shank secured to the front end of said handle, an externally threaded bearing plug adjustably secured in the threaded rear end of said handle being formed with an axial bearing bore in its front end and an annular bearing shoulder on the front end thereof, a longitudinally adjustable shank having its rear end in the bore in said plug and extending through said bearing opening in the front end of said handle to lie adjacent to and parallel with said fixed shank, jaws on the ends of said shanks, a fixed collar secured about said adjustable shank adjacent its rear end, a coil spring about said adjustable shank between said collar and said annular bearing shoulder on said plug, said handle being slotted adjacent its forward end, a trigger secured to said adjustable shank extending through said slot for moving said adjustable shank inwardly to open said jaws against the tension of said coil spring, and means for variably tensioning said spring to effect different degrees of clamping action between said jaws.

2. A welding rod holder comprising an elongated hollow handle having an axially disposed bearing opening in its front end and being internally threaded at its open rear end, a forwardly extending fixed shank secured to the front end of said handle, an externally threaded bearing plug adjustably received in the threaded rear end of said handle being formed with an axial bearing bore in its front end and an annular bearing shoulder on the front end thereof, a longitudinally adjustable shank having its rear end in the bore in said plug and extending through said bearing opening in the front end of said handle to lie adjacent and parallel with said fixed shank, jaws on the ends of said shanks, a fixed collar secured about said adjustable shank adjacent its rear end, a coil spring about said adjustable shank between said collar and said annular bearing shoulder on said plug, said handle being slidably adjacent its forward end, a trigger secured to said adjustable shank for moving said adjustable shank inwardly to open said jaws against the tension of said coil spring, a guide loop secured to said fixed shank and surrounding both of said shanks for holding the ends of said shanks in parallel adjustment, the jaws on the outer ends of said shanks having parallel extending angled clamping surfaces, and means for variably tensioning said spring to effect different degrees of clamping action between said jaws.

PRESTON BROWN.

REFERENCES CITED

The following references are of record in the file of this patent:

UNITED STATES PATENTS

| Number | Name | Date |
|---|---|---|
| 1,784,075 | Quisenberry | Dec. 9, 1930 |
| 2,085,853 | Graves | July 6, 1937 |
| 2,162,112 | Nichels | June 13, 1939 |
| 2,349,510 | Mathews et al. | May 25, 1944 |